Patented Mar. 10, 1931

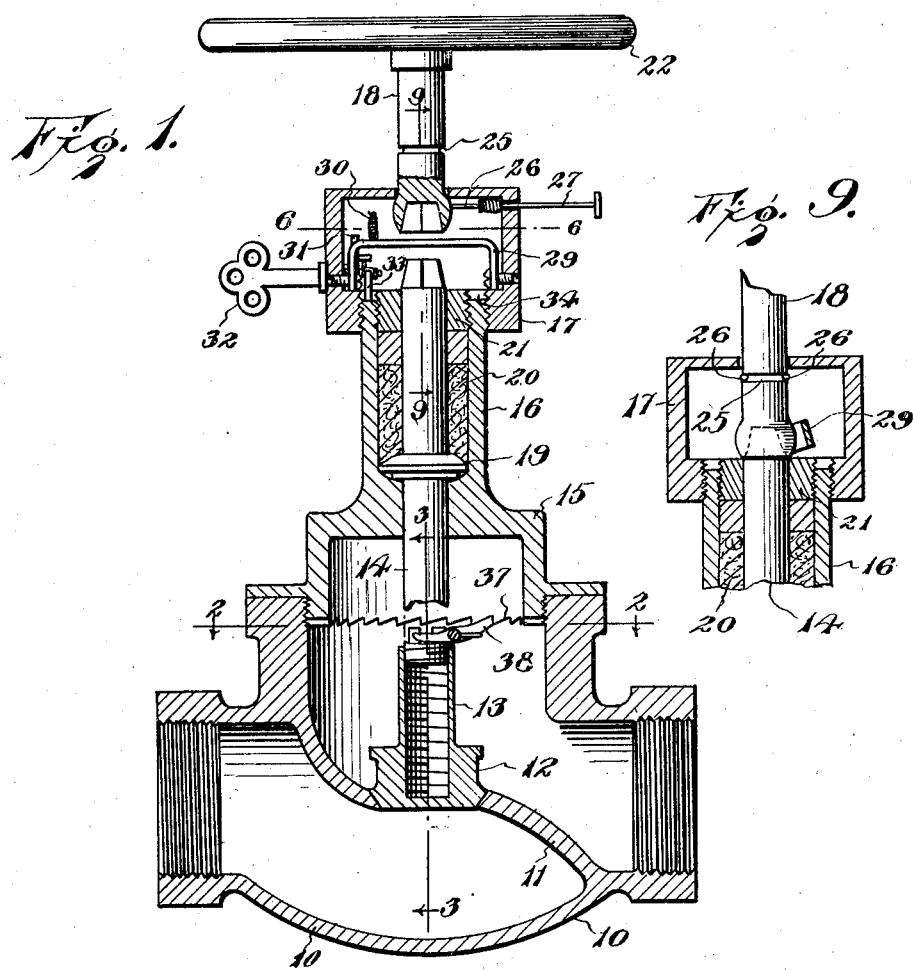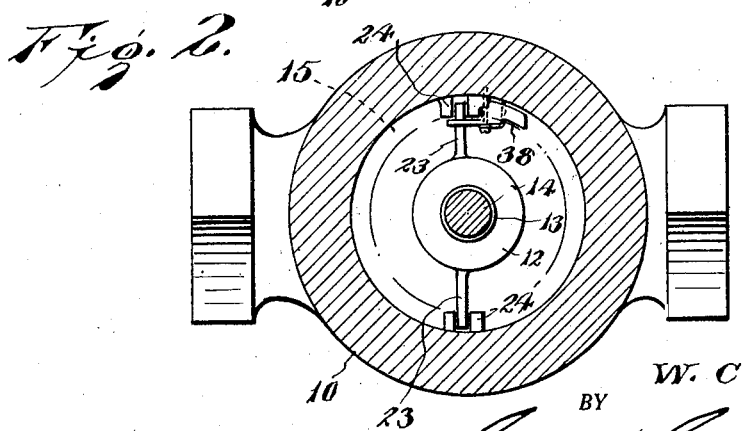

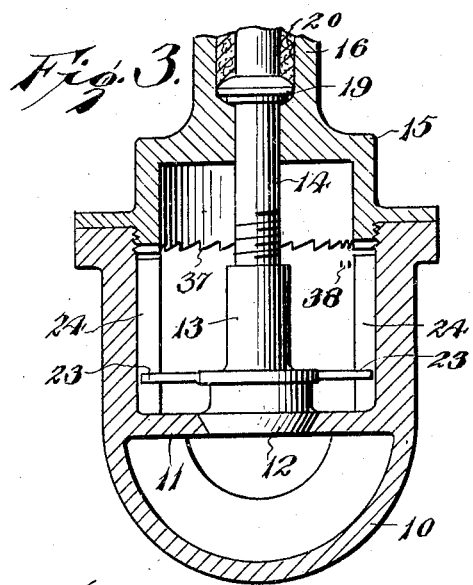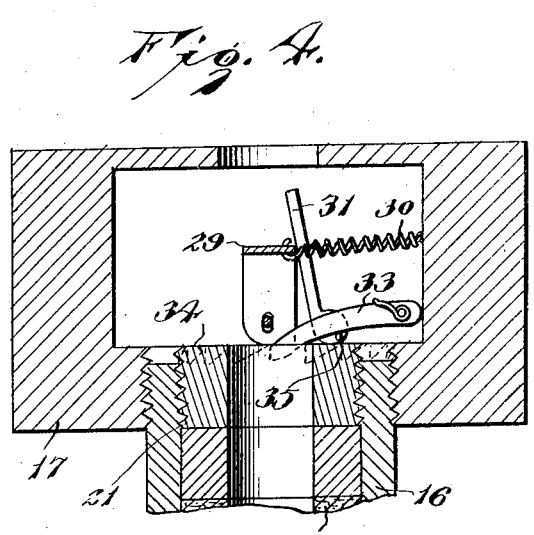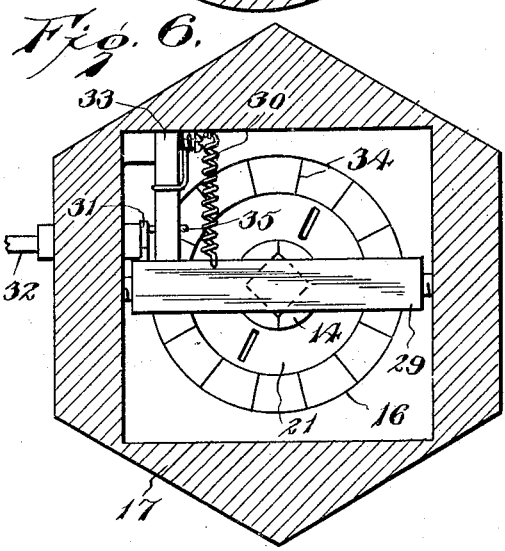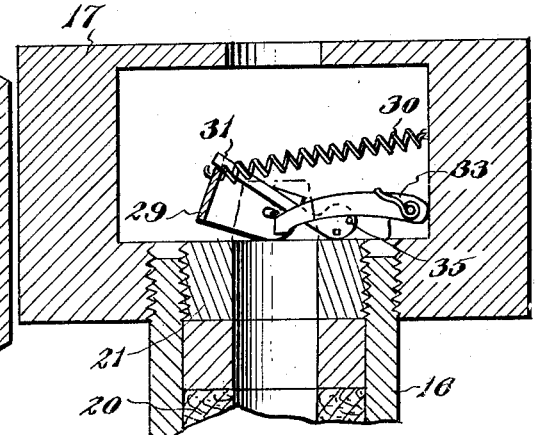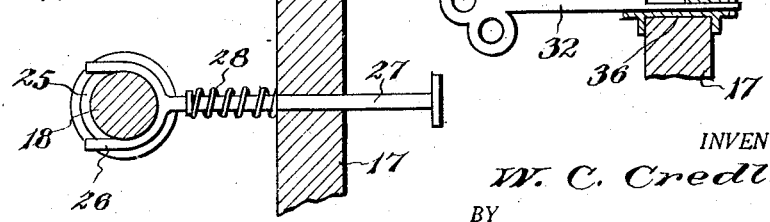

1,795,839

UNITED STATES PATENT OFFICE

WALTER C. CREDLE, OF FAIRFIELD, NORTH CAROLINA

TAMPERPROOF VALVE

Application filed September 6, 1928. Serial No. 304,261.

The invention relates to valves and more particularly to globe valves, and has for its primary purpose to prevent unauthorized operation of the valve and interference with the working parts thereof.

The invention provides a valve, including a sectional screw stem and a key operated barrier normally holding the sections of the stem separated, whereby to prevent operation of the valve in the accustomed manner.

The invention also contemplates a valve in which the casing comprises parts held against surreptitious separation, thereby preventing tampering with the interior parts and structure.

The invention furthermore supplies a valve having a sectional stem and provided with means for holding the sections of the stem in engagement when adjusted to operative position.

While the drawing illustrates a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which:—

Figure 1 is a vertical, central sectional view of a globe valve embodying the invention, showing the sections of the screw stem separated and the barrier therebetween.

Figure 2 is a horizontal sectional view on the line 2—2 of Figure 1, the dotted lines indicating the position of the bonnet.

Figure 3 is a detail sectional view on the line 3—3 of Figure 1 looking in the direction indicated by the arrows.

Figure 4 is a fragmentary sectional view of the upper portion of the bonnet and cap applied thereto showing the normal position of the barrier and the key operated mechanism associated therewith, the parts being shown on an enlarged scale.

Figure 5 is a view of the parts illustrated in Figure 4 showing the barrier thrown out of the path of the screw stem and the lock for the cap released.

Figure 6 is an enlarged detail sectional view on the line 6—6 of Figure 1.

Figure 7 is an enlarged fragmentary sectional view of the key operated mechanism for holding the barrier and the cap locked.

Figure 8 is a fragmentary sectional view showing more clearly the means for holding the sections of the screw stem in engagement.

Figure 9 is a fragmentary sectional view on the line 9—9 of Figure 1 looking in the direction designated by the arrows, showing the sections of the stem held in engagement and the barrier turned aside.

Corresponding and like parts are referred to in the following description and designated in the several views of the drawings by like reference characters.

The body or casing of the valve is designated by the numeral 10 and includes the usual partition 11 in which is formed the opening controlled by the valve element 12 formed with a tubular extension 13 which is internally threaded to receive the lower section 14 of the screw stem. The bonnet 15 threaded to the side opening of the casing 10 is formed with an extension 16 to which a cap 17 is threaded. The section 14 of the screw stem is mounted in the bonnet 15 and the companion section 18 is mounted in the cap 17, the two sections 14 and 18 being coupled so as to rotate to effect seating or unseating of the valve 12 as may be required. The section 14 is formed with an annular enlargement 19. A packing 20 slips upon the upper portion of the section 14 and maintains a tight joint between said section and the extension 16 of the bonnet and is confined by means of a plug 21 threaded into the upper end of the extension 16. The section 14 of the screw stem is held against longitudinal movement and is adapted to rotate only. The section 18 is free to rotate and to move longitudinally in the cap 17. A suitable handle 22 is fitted to the upper end of the part 18 and provides convenient means for rotating the stem when opening or closing the valve.

Rotation of the valve element 12 is prevented by lateral extensions 23 and guides 24.

The lateral extensions 23 consist of opposed arms and the guides 24 consist of spaced ribs between which the outer ends of the arms 23 are received. When the section 18 of the valve operating stem is moved inwardly it engages the section 14 and upon rotating the stem the valve 12 is moved towards or away from its seat as will be readily appreciated.

An annular groove 25 formed in the part 18 is engaged by a fork 26 when the section 18 is moved inward into engagement with the section 14 thereby holding the two sections of the valve operating stem in engagement. The fork 26 is provided upon the inner end of a stem 27 which is slidably mounted in a side of the cap 17. A spring 28 mounted upon the inner end of the stem 27 normally urges the fork 26 into engagement with the part 18 so as to enter the groove 25 when said part 18 is moved inwardly to engage the part 14.

A barrier 29 is located within the cap 17 and is pivoted thereto and normally occupies a position in the path of the movable part 18 of the valve operating stem so as to obstruct the inward movement thereof and prevent coupling of the sections 18 and 14. The barrier 29 is in the form of a yoke or arch and is pivoted at its extremities to opposite walls of the cap 17.

A spring 30 normally exerts a force upon the barrier 29 to hold it in operative position so as to prevent inward movement of the part 18. The barrier 29 has a limited movement in one direction whereby it is maintained in operative position. A key operated trip 31 is located within the cap 17 adjacent a pivot end of the barrier 29 and when operated by means of the key 32 throws the barrier to one side out of the path of the part 18 thereby admitting of the outer section of the valve operating stem being moved inwardly to engage the screw section 14. This is indicated most clearly in Figure 5 of the drawings.

A pawl 33 pivoted at one end to the cap 17 has its opposite end arranged to coact with teeth 34 formed at the top of the extension 16 whereby to prevent removal of the cap 17 by a reverse movement. A pin 35 projecting laterally from the key operated trip 31 extends across the path of the pawl 33 and operates the latter to effect disengagement thereof from the teeth 34 thereby admitting of removal of the cap 17 should displacement thereof be desired for any purpose. The normal position of the barrier 29, locking pawl 33 and key operated trip 31 is indicated most clearly in Figure 4 of the drawings, and the position of such parts when operated is shown most clearly in Figure 5 of the drawings.

Any suitable lock mechanism may be provided to cooperate with the trip 31 to admit of its operation by means of a key 32 and, as indicated, a bushing 36 is mounted in the side of the cap 17 and coacts with the parts 31 and 32.

Teeth 37 are formed upon the inner or lower end of the bonnet 15 and coact with a pawl 38 pivoted within the body or casing 10 whereby to prevent unscrewing and removal of the bonnet. As shown most clearly in Figure 2 of the drawings an end of the pawl 38 projects across one path of the arm 23 and in consequence said pawl is moved to clear the teeth 37 when the valve element 12 is moved to approximately the limit of its upward movement.

It is observed that the invention results in the provision of a valve which may not be surreptitiously operated, or tampered with, since the sections comprising the valve operating stem are normally held separated and the component parts of the body, or casing, are locked against separation thereby making it necessary to use a key when it is required to operate the valve or to gain access to any of the working parts.

Having thus described the invention, I claim:

1. In a valve, a valve operating stem consisting of normally separated sections, a substantially U-shaped barrier pivoted at its ends with its intermediate portion disposed between the sections of the stem to prevent their engagement, and key operated means for rocking the barrier to dispose the intermediate portion thereof at one side of the stem and permit the sections to be coupled.

2. A valve comprising a casing, a bonnet fitted to the casing, a lock element normally preventing removal of the bonnet, and a valve element for releasing the lock member to admit of displacement of the bonnet when it is required to gain access to the interior of the casing.

3. A valve comprising a casing, a valve element therein, a bonnet threaded to the casing, a cap threaded to the bonnet, a stem section rotatably mounted in the bonnet and having screw threaded connection with the valve element, a stem section mounted in the cap and adapted to rotate and move longitudinally therein, a barrier normally interposed between the stem sections, a locking member for preventing displacement of the cap, a key operated trip for turning the barrier aside and releasing the lock member, means for holding the stem sections coupled when in engagement, and lock means for the bonnet releasable by the valve element when the latter is moved to open position.

4. In a valve, the combination of a valve element mounted for longitudinal movement and held against rotation, a stem section engaged with the valve element and mounted for rotation but held against longitudinal movement, a second stem section mounted for rotation and longitudinal movement and normally separated from the first stem section and constructed to engage said section, a barrier normally extending between the stem sections to prevent their engagement, and key-controlled means for rocking the barrier to one side for permitting engagement of the sections.

5. In a valve, the combination of a valve stem consisting of alined sections, a cap housing the opposite ends of the sections, a barrier pivoted at its ends at diammetrically opposite points of the cap, means for yieldably holding the barrier between the valve stem sections to prevent their engagement, and a key-controlled element mounted in the cap adjacent one end of the barrier and bearing against a side thereof in opposition to the yieldable means whereby the barrier may be rocked to one side to permit coupling of the valve stem sections.

6. In a valve, the combination of a valve stem consisting of alined sections, a cap housing the opposite ends of the sections, a barrier pivoted at its ends at diametrically opposite points of the cap, means for yieldably holding the barrier between the valve stem sections to prevent their engagement, a key-controlled element mounted in the cap adjacent one end of the barrier and bearing against a side thereof in opposition to the yieldable means whereby the barrier may be rocked to one side to permit coupling of the valve stem sections, a latch acting to prevent removal of the cap, and means on the key-controlled element to release the latch when the barrier is rocked from between the stem sections.

In testimony whereof I affix my signature.

WALTER C. CREDLE. [L. S.]